UNITED STATES PATENT OFFICE.

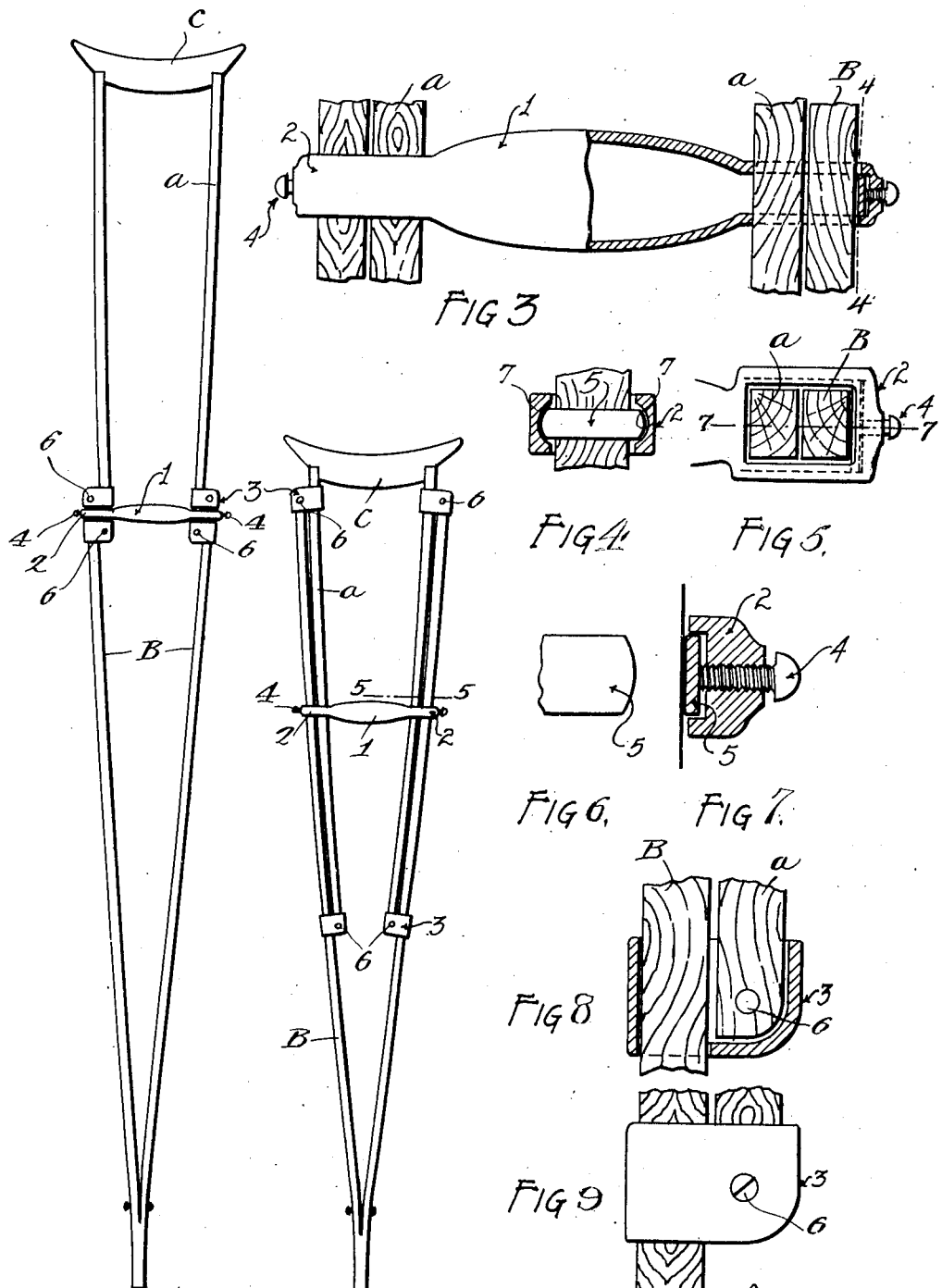

JOHN BENTLEY BEMIS, OF ST. PAUL, MINNESOTA.

CRUTCH.

1,322,084.

Specification of Letters Patent.

Patented Nov. 18, 1919.

Application filed March 3, 1917. Serial No. 152,264.

*To all whom it may concern:*

Be it known that I, JOHN BENTLEY BEMIS, a citizen of the United States, residing at St. Paul, in the county of Ramsey and State of Minnesota, have invented certain new and useful Improvements in Crutches, of which the following is a specification.

The object of my invention is to simplify and cheapen the construction of crutches which are adjustable to the height and length of arm of various users.

A further object is to provide a strong and simple handle for such a crutch.

Another object is to provide simple and economical means for locking the adjustable members of the crutch in position, so as to insure against accidental displacement while the crutch is in use.

In the accompanying drawings, Figure 1 is a longitudinal view of my crutch fully extended; Fig. 2 is a similar view showing the crutch in the position of its shortest adjustment; Fig. 3 is a view of the adjustable handle and locking means with parts shown in sections; Fig. 4 is a transverse section of the clamping means taken on the line 4—4 of Fig. 3; Fig. 5 is an enlarged section on the line 5—5 of Fig. 2; Fig. 6 is a diagrammatic sketch illustrating the end contour of the clamping plate embodied in my device; Fig. 7 is an enlarged, vertical, central section on the line 7—7 of Fig. 5; Fig. 8 is a central, vertical section of the part shown in Fig. 9 and Fig. 9 is an enlarged side view of the sliding links illustrated in Figs. 1 and 2.

Referring to the drawings, I have used the reference letters A and B to indicate respectively the upper and lower sections of my extensible staves. Said sections slide upon each other to secure adjustability to height. The lower ends of the section B of the staves are united in the usual manner, and the upper ends of the section A are suitably fastened to an arm rest C, while the free end of each of the staves A and B is supplied with a sliding link 3. Each link 3 is secured to a section by means of a screw or rivet 6 passing through the sides of the link and the end of such section, and each link also slidably encircles the companion section of the staff and thus holds both sections in alinement..

The handle or grip 1 is adjustable, for length of arm, with respect to the sections A and B, and is provided at its ends with means for locking the staves rigidly in any adjusted position. The central portion or grip proper of this handle 1 is preferably a hollow metal tube shaped to conform to the hand, and the collars 2 on its ends are integral therewith and adapted to freely receive the overlapping portions of the staves. Internal grooves 7 are formed in the sides of these collars 2 and a compression plate 5, having convex ends corresponding to the concavity of the groove 7, is inserted in each collar. This interfitting of the plate 5 and collar 2 prevents displacement of the plate. A screw 4, threaded centrally in the outer end of each collar 2 and extending therethrough clamps said compression plate against the overlapped staves.

In adjusting my crutch to various heights, the screws 4 are retracted by a suitable tool thus loosening the plate 5 and permitting the sections A and B to slide endwise through the collar. When the arm rest C is at the desired height, the handle 1, now free to move between the links 3, is placed at the desired height and the screws 4 in each end thereof are screwed against the compression plates 5, thus forcing said plates against the staves and clamping such staves against the inner walls of the collar 2; whereby the sections A and B are locked with respect to each other and the handle is rigidly held in position. When thus locked, torsional strains upon the grip 1 will not affect the clamps, and danger of accidental collapse of the crutch when in use is eliminated.

Having described my invention what I claim as new and desire to protect by Letters Patent is:

1. In an adjustable crutch, extensible overlapped staves, a handle comprising a grip having integral collars at each end encircling said overlapped staves, internal grooves in said collars, a compression plate slidable in said grooves, and means to clamp said plate against said staves.

2. In an adjustable crutch, extensible staves comprising upper and lower sections, a handle, comprising a grip having integral collars at each end encircling said staves, a compression plate within said collar, and a screw in the outer ends of said collars for clamping said plate against said staves and thereby locking said handle with respect to said staves.

3. In an adjustable crutch, imperforate extensible staves, a handle comprising a grip having collars at each end encircling said staves, a clamping device in the outer end of each collar adapted to be actuated independently of said grip to frictionally engage said staves and secure said handle and staves in fixed relation.

4. In a crutch, extensible, overlapped, sectional staves, an adjustable handle comprising a tubular grip formed with collars at each end encircling said sections, a compression plate slidable within said collars, and means to frictionally engage said plate against the outer section of said staves.

In testimony whereof I affix my signature in presence of two witnesses.

JOHN BENTLEY BEMIS.

Witnesses:
EMILY PRIEBE,
A. H. GOODRICH.